Figure 1:
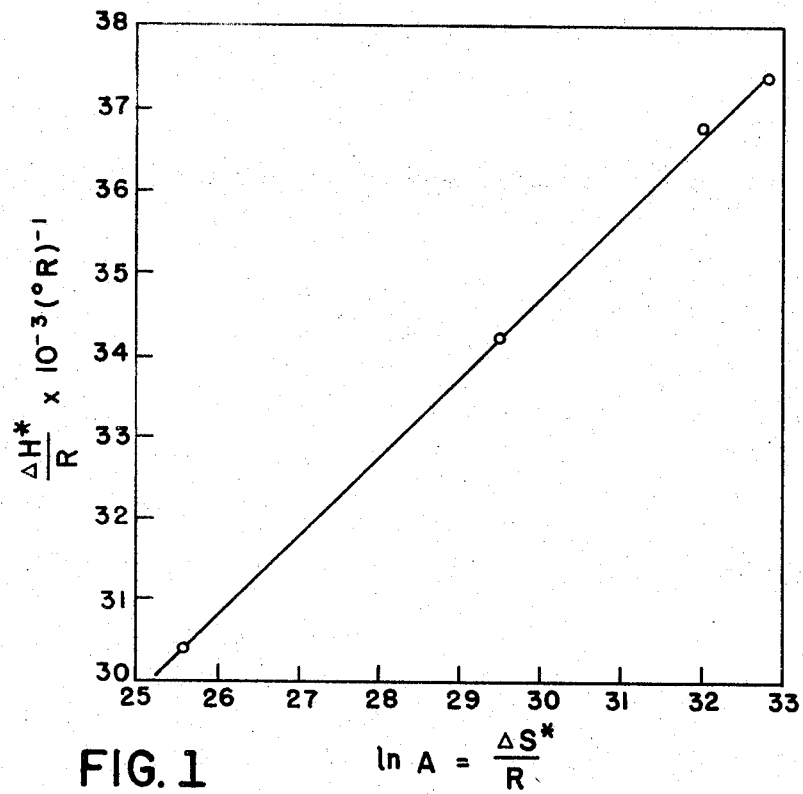

United States Patent [19]

Rase et al.

[11] 3,865,750

[45] Feb. 11, 1975

[54] TITANIUM CARBIDE CATALYSTS, AND THE CATALYST COMPOSITIONS

[75] Inventors: Howard F. Rase, Austin; Larry A. Maddox, Corpus Christi, both of Tex.

[73] Assignee: Exxon Research and Engineering Company, Linden, N.J.

[22] Filed: Dec. 27, 1971

[21] Appl. No.: 212,376

[52] U.S. Cl.................. 252/443, 208/112, 208/134, 208/216, 208/217, 252/447, 252/455 Z, 252/461, 260/683.9
[51] Int. Cl............................................. B01j 11/82
[58] Field of Search .................................... 252/443

[56] References Cited
UNITED STATES PATENTS

| | | | |
|---|---|---|---|
| 1,930,716 | 10/1933 | Jaeger................................ | 252/443 |
| 2,287,891 | 6/1942 | Linckh............................ | 252/443 X |
| 2,539,414 | 1/1951 | Frankenburg.................... | 252/443 X |
| 2,945,019 | 6/1960 | Wszolek.......................... | 252/443 X |
| 3,162,606 | 12/1964 | Giraitis et al. .................. | 252/443 X |
| 3,288,724 | 11/1966 | Russell et al........................ | 252/443 |

*Primary Examiner*—H. Sneed
*Attorney, Agent, or Firm*—L. A. Proctor

[57] ABSTRACT

A hydrocarbon conversion process and catalyst, the latter comprising a transition metal, or other hydrogenation-dehydrogenation component of said metal, composited with a nonstoichiometric titanium carbide support, particularly a support wherein the titanium carbide is an interstitial solid solution that possesses a stable phase over the stoichiometric range $TiC_{0.52}$ to $TiC_{0.99}$, and preferably within a range of $TiC_{0.70}$ to $TiC_{0.95}$. Such catalysts are useful for such hydrocarbon conversion processes as hydrogenation-dehydrogenation, hydrofining, hydrodesulfurization and reforming. By varying the stoichiometry of the titanium carbide support within the limits described, an interaction is created between the hydrogenation-dehydrogenation component and the support, and the activity and selectivity of the reactions can be controlled and optimized.

13 Claims, 2 Drawing Figures

TITANIUM CARBIDE CATALYSTS, AND THE CATALYST COMPOSITIONS

It has long been known in the art of catalysis to form catalysts by dispersing catalytic metals on solid supports, and to use such composites for effecting or influencing the results of a chemical reaction as to yield, character of product, or rate of reaction. It was generally believed that the supports played a rather passive role in catalyzing such reactions. The catalyst, it was believed, simply acted as a medium for dispersion of the catalytic metals, and any results different from that which would have been obtained in the absence of the support was generally attributed to the greater effectiveness of the metal due to its increased surface area. It is now recognized, however, that this theory is simply inadequate to explain the nature of most catalytic reactions. It is now believed that in many cases catalytic metals interact in some way with the supports to produce results which cannot be accounted for by the older attempted explanations. Despite such recognition, little has been done to explain these interactions, and even less has been done to utilize such recognitions in a practical way.

Many catalysts are formed by compositing various transition metals or compounds with solid supports, the metals or compounds thereof acting as hydrogenation-dehydrogenation components. The most prevalent of supports are refractory inorganic oxides such as alumina, silica, silica-alumina, kieselguhr, magnesia, thoria, boria, zirconia, titania, various types of spinels and even zeolites or the so-called molecular sieve bases, and the like. In preparation of a catalyst, the refractory inorganic oxide is usually pilled, pelleted, beaded, or extruded, alone or in admixture with other materials, then dried and crushed to particles of desired size. The solid is generally treated by contact with an aqueous solution or a salt containing the desired metal, or metals. The salts can be added in admixture or in a sequence of contacts with different solutions. The so-treated solids can be dried, calcined and then contacted with hydrogen, in situ or ex situ, to reduce the salt to the desired metal, or, e.g., oxided or sulfided to produce a compound of the metal. Illustrative of such catalysts are those typically used in hydrofining or hydrodesulfurization reactions wherein a support, e.g., an alumina, and composited with a metal, or metals, or compounds thereof, of Group VIB and the nonnoble Group VIII metals such as molybdenum, tungsten, cobalt, nickel and mixtures of these and other metals. Reforming catalysts are also typical of such catalysts. These generally comprise the noble metals of Group VIII, e.g., the most significant of which is platinum, or mixtures of these and other metals as hydrogenation-dehydrogenation components, also typically composited with alumina or other inorganic oxide support. In reforming catalysts, a small amount of an acidic substance is generally composited with the alumina and metal to provide acidity to effect isomerization reactions as well as hydrogenation-dehydrogenation reactions. Hydrocracking catalysts are formed by incorporation of such metals, or compounds thereof, as hydrogenation-dehydrogenation components with crystalline aluminosilicate zeolite or molecular sieve bases.

Titanium carbide has also been used in catalysis, and the compound $TiC_x$, i.e., titanium carbide which contains titanium and carbon in equal atomic fractions (or $TiC_x$, where $x = 1.0$), has been used as a catalyst, catalyst support or even as an activator for conducting certain types of chemical reactions. While this compound has never attracted much attention for use as a catalyst, it nonetheless has been recognized useful as a substrate which, despite its lack of porosity, had certain desirable physical properties. It is thus extremely hard and abrasion-resistant and its refractory nature makes it especially suitable at high temperatures, particularly where it may be subjected to thermal shock. In U.S. Pat. No. 3,162,606 titanium carbide is also mentioned as an inert substrate on which nickel is deposited to form a catalyst useful for hydrogenation-dehydrogenation reactions. Titanium carbide as suggested, however, has been used to some extent as a catalyst, or promoter in catalyst systems. For example, in U.S. Pat. No. 1,217,118 titanium carbide is suggested as a hydrogenation catalyst for treating and saturating unsaturated fats, fatty acids and glycerids. In U.S. Pat. No. 1,930,716 it is described as a useful catalyst for oxidation reactions such as the production of phthalic anhydride and maleic acid from phenanthrene, and the like. In accordance with U.S. Pat. No. 2,287,891 titanium carbide is added as an activator to an iron synthesis catalyst to produce hydrocarbons from hydrogen and carbon monoxide. And, in accordance with U.S. Pat. No. 2,539,414 titanium carbide is suggested as useful for catalyzing the reaction of carbon monoxide and hydrogen to produce hydrocarbons and oxygenated hydrocarbons.

The use of nonstoichiometric titanium carbide, i.e., $TiC_x$ wherein $x$ is greater than 0 but less than 1.0, in catalysis appears rare. Nonetheless, the use of a titanium carbide catalyst comprising nonstoichiometric amounts of titanium and carbon is disclosed in U.S. Pat. No. 2,945,019. In accordance with this patent, ethylene is polymerized to produce a solid product by reaction with $TiC_x$, and very preferably in addition a trialkyl aluminum compound, $x$ being described as having a value ranging from 0.5 to 1, inclusively. Insofar as known, however, nonstoichiometric titanium carbide has never been composited with metals and used as a catalyst.

It is among the objects of this invention:

To provide new and novel catalysts which are particularly useful in hydrocarbon conversion and related reactions such as hydrofining, hydrocracking and reforming.

To provide new and novel catalysts comprising composites of hydrogenation-dehydrogenation components and a support, or base, the properties of which can be conveniently modified by altering the stoichiometry of the support, or base.

To provide catalysts of such character particularly useful in reactions wherein the control of activity and selectivity is essential.

To provide new and novel hydrogenation-dehydrogenation processes, especially fuels processes which include hydrofining, hydrosulfurization and reforming processes.

These objects and others are achieved in accordance with this invention, an embodiment of which comprises a metal or compound of a metal, the metal of which is selected from Groups VB, VIB, VIIB and VIII for the Periodic Chart of the Elements (E. H. Sargent & Co., Copyright 1962 Dyna-Slide Co.) composited with a nonstoichiometric titanium carbide support characterized as an interstitial solid solution which possesses a stable phase over the stoichiometric range $TiC_{0.52}$ to $TiC_{0.99}$, and preferably over the stoichiometric range of $TiC_{0.70}$ to $TiC_{0.95}$. Generally, the catalyst comprises from about 0.1 to about 50 percent of the compound of the metal, or metal, preferably from about 0.3 to about 15 percent of the metal, or compound of the metal, or from about 99.9 to about 50 percent of the titanium carbide, and preferably from about 99.7 to about 85 percent of the titanium carbide. In many instances a third component is added to the composite. For example, an acidic component can be combined with the titanium carbide component as where an acidic function is desired, e.g., alumina, amorphous silica-alumina or zeolite, as in reforming or hydrocracking. In other types of reactions an inert or nonreactive substance, e.g., kieselguhr or alumina, may be added to increase the available catalyst surface area. In such instances, the sum-total weight concentration of the third component with the titanium carbide would range from about 99.9 to about 50 percent, or from about 99.7 to about 85 percent. Over this range of stoichiometric concentrations of tungsten and carbon, the physical properties of the titanium carbide are nearly independent of carbon content but nonetheless the change of valencies in the tungsten carbide lattice with the changing stoichiometry produces rather significant changes in the activity and selectivity of the total catalyst composite.

These catalysts are particularly useful for effecting hydrogenolysis and hydrogenation-dehydrogenation reactions generally, and for effecting such hydrocarbon conversion reactions as hydrofining, hydrodesulfurization and reforming.

Hydrogenation

The catalysts of the present invention are thus suitable for effecting the hydrogen saturation of unsaturated hydrocarbons such as aromatics and olefins, including monoolefins and polyolefins, both straight chain and branched chain, whether substituted or unsubstituted. In fuels processing, the saturation of lower molecular weight olefins having a carbon content ranging from about 2 to about 12, and preferably from about 2 to about 6, is generally of greatest importance. For example, butylene polymers and light catalytically cracked naphtha, steam cracked naphtha, and the like, can be hydrogenated to produce aviation gasoline components. In hydrogenation, hydrogen atoms are directly added to unsaturated bonds of the material being processed. Other important applications of hydrogenation for which the present catalysts are suitable include the refining of lube oil distillates, white oils, the production of high quality diesel oils, heating oils, and kerosene. The catalysts are also suitable for use in removal of organic nitrogen and sulfur to improve the color and stability of various products, e.g., heating oils.

Preferred metals for incorporation, or deposition, within the nonstoichiometric titanium carbide base are those of Groups VIB, VIIB and VIII, of the Periodic Chart of the Elements, including, e.g., chromium, cobalt, molybdenum, rhenium, cobalt, nickel, platinum, palladium, or mixtures of these and other metals. Suitably the metals are composited with the base in concentration ranging from about 0.1 to about 20 weight percent, and preferably from about 1 to about 5 weight percent.

Hydrogenation reactions are generally conducted at temperatures ranging from about 120°F. to about 850°F., preferably from about 300°F. to about 650°F., and at pressures ranging from about 100 psi to about 3,000 psi, and preferably from about 100 psi to about 500 psi. Space velocities, LHSV, generally range from about 0.5 to about 5, and preferably from about 1 to about 2. Hydrogen is generally introduced at a rate of from about 300 to about 5,000 SCF/Bbl., and preferably from about 500 to about 3,000 SCF/Bbl.

Hydrocracking

These novel catalysts, when formulated with a suitable acidic component, are suitable for use in hydrocracking at relatively low temperature and relatively high pressure to provide a process for considerable flexibility in changing the ratios and character or quality of the products. Suitably, temperature on the order of from about 480°F. to about 840°F., and preferably from about 660°F. to about 800°F., and pressures ranging from about 400 to about 3,000 psi, and preferably from about 500 to about 2,500 psi, are used to convert middle-boiling or high-boiling materials into high octane gasoline and jet fuel as well as for producing feedstocks for catalytic reforming. Space velocities, LHSV, can range from about 0.1 to about 10 but preferably range from about 1 to about 3, and hydrogen gas recycle rates are generally maintained at from about 3,000 to about 12,000 SCF/Bbl., and preferably from about 4,000 to about 8,000 SCF/Bbl.

The catalysts can be used at hydrocracking conditions in both sweet (low sulfur) and sour (high sulfur) operations, or in the presence of both sulfur and nitrogen. Conditions of temperature and feed, i.e., sulfur and nitrogen, can be adjusted to maximize yields of gasoline or jet fuel.

The several types of operation for which the catalysts of this invention are useful can be illustrated in the new conventional process wherein three reactors are employed in series, a first reactor of the series constituting a hydrofiner, a second reactor of the series constituting a first stage hydrocracker, and a third reactor of the series constituting a second stage hydrocracker. In such operation, a catalyst is employed in the hydrofiner which is active in the presence of both organic sulfur and organic nitrogen and the conditions of operation are relatively mild. Cracking is held to a minimum, and both the sulfur and nitrogen are converted essentially to hydrogen sulfide and ammonia, respectively. Neither the hydrogen sulfide nor ammonia need be removed from the effluent passed from the hydrofiner to the first stage hydrocracker and hence the latter reactor is operated with sulfur and nitrogen present. The second stage hydrocracker of such reactor series can be operated sweet, by removal of the hydrogen sulfide from the effluent of the first stage hydrocracker, or sour if desired, dependent upon the nature of the catalyst employed. The catalysts of the present invention can be used in each type of operation.

A wide range of products is obtainable from this process which is the result of using the present catalysts. The cracking function is provided by combining alumina, amorphous silica alumina, or crystalline zeolites either before or after impregnating with the active metal, or metals. The hydrogenation function is provided by a metallic hydrogenation component, e.g., Group VIB, VIIB and VIII metals, of the Periodic Chart of the Elements, such as molybdenum, tungsten, platinum, nickel, cobalt and the like, impregnated or otherwise deposited on the support. Suitably, the metals are composited with the base in concentration ranging from about 0.1 to about 20 weight percent, and preferably from about 1 to about 5 weight percent.

Feedstocks which can be hydrocracked contain paraffins, olefins, naphthenes, and aromatics. These materials are included in virgin or previously processed refinery streams boiling above about 390°F., and preferably above about 450°F., e.g., light cat cycle oil boiling between about 390°–600°F., heavy cat cycle oil boiling between about 600°–800°F., light virgin gas oil boiling between about 390°–600°F., and heavy virgin gas oil boiling between about 600°–1,000°F., and higher. Examples of previously processed refinery streams include coker stocks, steam cracked stocks and cat cracker stocks.

Hydrodesulfurization

The catalysts are also useful in processes for the hydrodesulfurizaiton of hydrocarbons, especially heavy hydrocarbon feedstocks having an initial boiling point of about 650°F., a 50 percent point of at least about 750°F., and higher, e.g., atmospheric gas oils, vacuum gas oils, atmospheric residuums, and the like. The catalysts are suitable for direct or indirect hydrodesulfurization reactions. Certain of these catalysts, those having a nonstoichiometric titanium carbide base component ranging from about $TiC_{0.70}$ to about $TiC_{0.95}$ have thus been found particularly useful for directly treating feedstocks which contain metal-bearing asphaltenes, materials normally found in residuals, which normally poison and deactivate hydrodesulfurization catalysts. Indirect hydrodesulfurization of feedstocks can also be accomplished by distilling out gas oil fractions from a heavier residual, treating the gas oil to remove sulfur, and then blending the desulfurized gas oil with the untreated residuum. The composite product, of course, contains less sulfur than prior to such treating and blending. Typically, e.g., a fuel oil containing 2–3 percent by weight sulfur can thus be treated to meet specifications requiring a maximum sulfur content of 0.5 percent by weight sulfur.

In direct treatment of hydrocarbon feedstocks, e.g., in a fixed bed or ebullating bed, it is generally preferred to operate, at the start of the run, at temperatures of about 750°F. to about 900°F. at end-of-run conditions. The pressures employed usually range from about 300 psi to about 3,000 psi, and preferably from about 800 psi to about 1,500 psi. Hydrogen rates range generally from about 500 SCF/Bbl. to about 10,000 SCF/Bbl., and preferably from about 1,000 SCF/Bbl. to about 5,000 SCF/Bl. The liquid hourly space velocities, LHSV, range generally from about 0.1 to about 10, and preferably from about 1 to about 3. The conditions employed for indirect dehydrodesulfurization are generally similar except the temperature employed is about 120°F. less at either start-of-run or at end-of-run conditions.

The hydrodesulfurization catalyst is generally comprised of a composite which includes the nonstoichiometric titanium carbide base and a hydrogenation component, viz., a metal, a metal oxide, or a metal sulfide, wherein the metal is from Groups VIB, VIII, or both, or the Periodic Chart of the Elements. The concentration of the metal, or mixtures of metals, incorporated within the base can vary widely, depending on the nature of the hydrogenation component and feedstock. The metal, of mixture of metals, of which cobalt, molybdenum, tungsten, and nickel are preferred, is generally incorporated within the base in concentration ranging from about 0.1 to about 25 percent by weight, and preferably from about 0.3 to about 15 percent by weight of the total composite. When hydrogenation components such as the oxides or sulfides of cobalt and molybdenum are utilized, the concentration will be generally 1 to 5 and 5 to 15 percent, respectively, based on the total weight of the composite.

Reforming

The catalysts are also suitable for conducting reforming, or for use in a process wherein naphtha is catalytically converted in an atmosphere rich in hydrogen to upgrade the naphtha to products of higher octane. The principal reactions which occur in reforming are dehydrogenation of naphthaenes to form aromatics, dehydrocyclization of paraffins to form aromatics, isomerization of n-paraffins to form iso-paraffins and ring isomerization.

Reforming is generally conducted at temperatures ranging from about 750°F. to about 1,020°F., and preferably from about 840°F. to about 925°F., and at pressures ranging from about 150 psi to about 550 psi, preferably from about 250 psi to about 475 psi. Hydrogen rates range generally from about 3,000 SCF/Bbl. to about 10,000 SCF/Bbl, and preferably from bout 5,000 SCF/Bbl. to about 8,000 SCF/Bbl. and the superficial liquid hourly space linear velocity, LHSV, ranges from about 1 to about 5, and preferably from about 2 to about 4.

The feedstocks employed in these reactions are naphthas boiling within the gasoline range, suitably heavy naphthas boiling in the range of from about 200°–375°F. or light naphthas boiling in the range of from about $C_5$–200°F. Naphthenic feeds are more easily reformed, while paraffinic feeds are the more difficult to reform. In selection of a suitable catalyst, a chief consideration, thereof, is to find a catalyst capable of synthesizing aromatics from paraffins and olefins, but particularly from naphthenes. The catalysts of the present invention, by modification of the nonstoichiometric titanium carbide base, can be readily modified to produce such reforming activity.

Useful reforming catalysts are composites formed from a titanium carbide base of $TiC_{0.52}$ to about $TiC_{0.90}$, the latter being deposited upon a suitable acid type support to provide an isomerization and other acid functions. In developing such supports, conventional supports known to the art are admixed with the titanium carbide and the mixture pilled, pelleted, beaded, or extruded and then dried and crushed to particles of desired size. Suitable hydrogenation components, which can be incorporated into the base, are the Group VIB, VIIB and VIII metals of the Periodic Chart of the Elements, preferred of which are the Group VIII platinum group metals, e.g., platinum, palladium and the like, or mixtures of these with other metals such as iridium, rhenium, or the like.

Suitably, the hydrogenation component, a metal or mixture of metals, is incorporated or added to the base in concentration ranging from about 0.1 to about 5 percent, based on the weight of the total catalyst, and preferably in concentration ranging from about 0.3 to about 1 percent. In addition, the composite can contain from about 0.1 to about 1 percent of halogen, preferably chlorine or bromine.

The reasons for the effectiveness of these catalysts in such reactions is not completely understood, though it is definitely established that both the activity and selectivity of a metal supported on titanium carbide can be affected by changes in the stoichiometry of the support within the ranges described. A reasonable explanation of this phenomenon, it is believed, is attributed to an electronic interaction between the nonstoichiometric titanium carbide support and the metal.

It has thus been observed that vacancies in the carbon lattice within the range $TiC_{0.52}$ to $TiC_{0.99}$ produce virtually no change in the physical properties of the titanium carbide, but relatively large changes in the Fermi energy. The most probable mechanism for this interaction is explained by W. Z. Schottky's theory of the electronic properties of solid-state interfaces [(Physik 113, 367 (1939)]. According to Schottky's theory, when two solids are brought together, electrons are exchanged until the Fermi energy of the two solids are equal at the interface. Electrons flow from the metal with the larger Fermi energy to the one with the smaller Fermi energy. In terms of work function, electrons are transferred to the metal of smaller work functions to the metal with larger work functions, creating an excess negative charge on the latter and a positive charge on the former. The band structure and bulk electrical properties of titanium carbide establish it as a member of a broad class of materials called "semi-metals." Semi-metals differ from metals mainly in their ability to conduct electrical current at low temperatures. Their electronic structure is much closer to that of a metal than to that of a semi-conductor or insulator. The description of the electronic effects of metal-to-metal junctions is thus believed applicable to the junction between the titanium carbide and the deposited catalytic metal. The direction of electron transfer can be deduced from the work function of the materials.

From the work function, it can be concluded that depositing nickel on nonstoichiometric titanium carbide causes a net transfer of electrons from the carbide into the metal, even though the Fermi energy decreases as carbon atoms are removed, and there is less difference in the Fermi levels as the carbide becomes more nonstoichiometric.

Band structure calculations thus indicate a decrease of approximately one electron in the Fermi energy of titanium carbide over the range of stoichiometry between $TiC_{1.0}$ and $TiC_{0.5}$. Therefore, a reasonably large change in the Fermi level of a metal-$TiC_x$ system would be expected as the carbon content is varied over that range. Hence, the electronic properties of the metal surface are a sensitive function of the stoichiometry of the carbide.

The electronic properties of a catalytic surface are determined by the surface potential of the metal crystal. The evidence suggests catalysis occurs at sites where there is some anomoly in the surface, such as structural defects, which produces a perturbation in the normal surface potential. If the magnitude and geometry of a perturbation are compatible with the electronic structure of the reacting species, there is a high probability that the reaction will occur at that site.

There are a number of possible structural defects, and all would be expected to perturb the surface potential. Only certain defects would have the combination of properties to produce an active site. As the Fermi level of the metal crystal is altered, however, the surface potential at every point is also altered, and the magnitude of the potential at every surface anomoly is changed. Certain sites that had previously been active can now have surface potentials so much larger or smaller that the probability of the reaction occurring at these sites would be drastically reduced. On the other hand, some sites, possessing favorable geometric properties, which are previously inactive, now have a suitable magnitude of potential to catalyze reactions. Therefore, changes in the Fermi level change the overall reaction rate by increasing or decreasing the number of sites with an acceptable electronic structure even though there is no indication that significant numbers of new sites are produced by changes in Fermi level.

Another manner in which the Fermi level alters the overall reaction rate is by increasing or decreasing the rate at a site that is already active. If the surface potential of a reaction site is changed, the energy input required to produce the electronic rearrangement can be expected to increase or decrease. The nature of the process and the direction in which the surface potential varies determines whether there would be a favorable or unfavorable change in the rate at that site. The overall change in reaction rate would be dictated by the average change in rate at all sites.

Changes in reaction rate are thus attributable to changes in the Fermi level of the support influenced by two factors, viz., changes in the number of sites with the proper potential to catalyze the reaction, and changes in the average energy of the electronic rearrangement.

The invention will be better understood by reference to the following non-limiting examples and data which illustrate its more salient features.

The examples immediately following demonstate the interaction between nonstoichiometric titanium carbide supports and catalytic metals, nickel being selected as the active catalytic metal component in these instances because of its high work function and wide commercial use in catalysis. The catalyst used in the runs described are precisely identical, differing only in the stoichiometry of the titanium and carbon components of the supports. Each catalyst is thus prepared to contain the same amount of nickel, each is impregnated and reduced in the same amount of nickel, each is impregnated and reduced in the same manner, and each has the same crystallite size in dispersed form.

EXAMPLE 1

Nonstoichiometric titanium carbide solid supports are prepared in highly purified form by sintering, in an inert atmosphere, under vacuum, mixtures of metallic titanium and stoichiometric titanium carbide, the sintering being effected in a zirconia insulated graphite crucible heated by a radiofrequency induction furnace. The mixtures are heated to 1,830°F. and degassed for 1 hour, the temperature is raised to 3,450°F., and sintered for 4 to 5 hours, and then cooled and impregnated with aqueous solutions of $Ni(NO_3)_2$. The series of compositions of titanium carbide solid bases prepared and selected for compositing with nickel are $TiC_{0.99}$, $TiC_{0.87}$, $TiC_{0.74}$, and $TiC_{0.62}$.

The catalysts are prepared by impregnating the selected series of nonstoichiometric titanium carbide bases with an aqueous solution of $Ni(NO_3)_2 \cdot 6H_2O$, and 10 percent metallic nickel is deposited thereon. The proper proportions of the titanium and the nickel salt are thus weighed together, the nickel salt being dissolved in distilled water, and the solution used to wet the surfaces of the bases. The water is removed from the supports after the impregnation by careful heating and the powdered catalyst is finely ground to pass a 50 mesh screen (Tyler series). The series of high purity nickel impregnated titanium carbide solid catalysts, after impregnation and drying, are reduced with hydrogen. (Detailed instructions for preparing titanium carbide bases of different stoichiometries, $Ni$-$TiC_x$, in a high state of purity, and the results of such tests are described in our publication entitled "Nickel on Nonstoichiometric Titanium Carbide," Industrial Engineering Product Research Development, Vol 10, No. 1, p. 32, March, 1971, which publication is herein referred to and incorporated by reference.)

In a series of runs, catalysts containing equal fractions of metallic nickel supported on titanium carbide bases of different stoichiometries, as described below, are charged into a reactor and supported as a bed on a quartz cloth. High grade ethane and pure hydrogen are premixed and fed as a charge into the reactor and the rate of ethane hydrogenolysis was measured between 500°–580°F. Measurements made of the apparent enthalpy of activation vs. the apparent entropy of activation reveals a linear relationship for this series of catalysts, defined in the table below.

Apparent Activation Energy and Entropy for Ethane Hydrogenolysis on Catalyst Series

| Catalyst | Support | A | $\Delta H^*/R$ | $\Delta S^*/R$ |
|---|---|---|---|---|
| Ni | $TiC_{0.99}$ | $6.375 \times 10^{12}$ | 34,185 | 29.488 |
| Ni | $TiC_{0.62}$ | $1.283 \times 10^{11}$ | 30,444 | 25.582 |
| Ni | $TiC_{0.74}$ | $8.324 \times 10^{13}$ | 36,695 | 32.058 |
| Ni | $TiC_{0.87}$ | $1.843 \times 10^{14}$ | 37,344 | 32.852 |

A = Pre-exponential factor
$\Delta H^*$ = Enthalpy of activation, Cal. gm-mole
R = Gas constant, 1.987
$\Delta S^*$ = Entropy of activation A graph of this table is given by reference to FIG. 1. The measured difference in $\Delta H^*$ between individual catalysts is 7Kcal per mol, which is established to accede any possible error in the measure of $\Delta H^*$.

Figure 2:
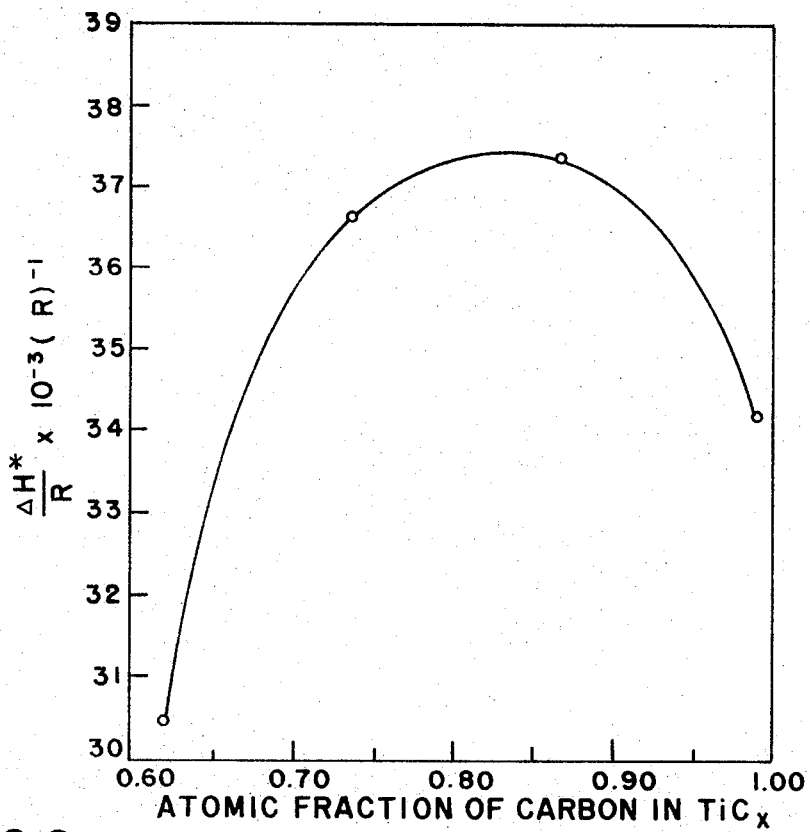

A plot of activation energy vs. atomic fraction of carbon in $TiC_x$, as described by reference to FIG. 2, reveals an optimum support stoichiometry for maximum $\Delta H^*$, and thus maximum $\Delta S$, above the isokinetic temperature because of the linear relationship. The composition of $TiC_{0.87}$ is thus shown, by reference to FIG. 2, to produce the most active Ni–TiC catalyst above the isokinetic temperature. Since each catalyst contains the same amount of nickel, is impregnated and reduced with hydrogen in the same manner, and has the same crystallite size and dispersion, it must be concluded that the nonstoichiometric titanium carbide supports definitely influence the reaction. Thus, the support did not participate directly, for it is known to be totally inactive by itself, by unquestionably the reaction is influenced. EXAMPLE 2

In this example it is demonstrated that the selectivity of a reaction is also affected by the stoichiometry of the titanium carbide support. Thus, when several reactions are possible on a catalyst, it is believed that electronic interaction between the catalyst and its support will affect each reaction in a different way because all reactions occur through separate intermediates. Each such intermediate, it is believed, will respond somewhat differently to changes in the electronic properties of the support and the corresponding reacting rate will respond differently as the electronic properties of the catalyst are varied. To establish this fact, cyclopropane is reacted with hydrogen in the presence of two selected members of the $Ni$-$TiC_x$ catalyst series, vis., $NiTiC_{0.87}$ and $NiTiC_{0.62}$.

A hydrogen cyclopropane reaction is chosen because it has been heretofore established by Taylor, et al. (J. Phys. Chem. 69, 3857; J. Catal. 4,374) that cyclopropane will react with hydrogen in two ways in the presence of nickel catalyst:

1. Hydrogenation

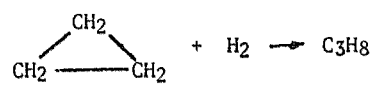

2. Hydrogenolysis

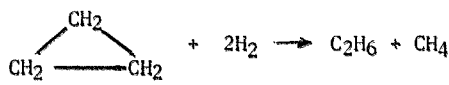

The reaction is conducted at 490°F., the isokinetic temperature for ethane, a temperature at which any decomposition of ethane, if any, would occur at the same rate of both of the selected catalysts. Thus, changes in the relative rates of the two cyclopropane reactions are not obscured by any possibility of further reactions of the ethane.

A series of six runs is conducted with each of the catalysts $NiTiC_{0.62}$ and $NiTiC_{0.87}$, the ratios of the products of reaction 1/reaction 2 are established, and the results are averaged as shown in the table below:

Ratio of Rate of Hydrogenation to Rate of Hydrogenolysis of Cyclopropane on Catalysts $Ni$-$TiC_{0.62}$ and $Ni$-$TiC_{0.87}$ at 490°F.

| Sample No. | $Ni$-$TiC_{0.62}$ | $Ni$-$TiC_{0.87}$ |
|---|---|---|
| 1 | 4.50 | 3.45 |
| 2 | 4.33 | 3.40 |
| 3 | 4.59 | 3.27 |
| 4 | 4.30 | 3.20 |
| 5 | 4.28 | 3.09 |
| 6 | 4.21 | 3.50 |
| Av. | 4.37 | 3.32 |

It will be observed that the hydrogenation rate of catalyst $NiTiC_{0.87}$ is 3.32 times faster than the hydrogenolysis rate. On catalyst $NiTiC_{0.62}$ the ratio of rates increased to 4.37. This confirms that the interaction between the metal and the base is capable of improving a catalyst even where several reactions are involved.

EXAMPLES 3–17

The foregoing runs are similarly conducted in comparative sense with other metals of high work function, and found to behave in generally similar manner. The metals deposited on the titanium carbide supports are iron, cobalt, rhodium, palladium, tungsten, rhenium and platinum.

General reaction types for which nickel and these additional metals are found active include:

1. Hydrogenolysis of carbon-carbon bonds.
2. Hydrogenolysis of carbon-nitrogen bonds.
3. Hydrogenolysis of carbon-halogen bonds.
4. Hydrogenolysis of carbon-sulfur bonds.
5. Hydrogenation-dehydrogenation of aromatic hydrocarbons.
6. Hydrogenation-dehydrogenation of aliphatic compounds.

The catalyst of this invention can be employed in any of the conventional types of equipment known to the art. For example, the catalyst can be employed in the form of pills, pellets, spheres, granules, broken fragments, or various special shapes, dispersed as a fixed bed within a reaction zone, or zones, and the charging stock can be passed therethrough as a liquid, vapor, or mixed phase, and in upward or downward flow. Alternatively, the catalyst can be prepared in suitable form for use in moving beds, in which the charged stock and catalyst are ordinarily passed in parallel flow. The catalyst can also be used in fluidized-solid processes, in which the charging stock is passed upwardly through a turbulent bed of finely divided catalyst. The catalyst can also be slurried in the charging stock and the resulting mixture conveyed to the reaction zone.

It is apparent that various modifications and changes can be made without departing the spirit and scope of the present invention, as will be apparent to those skilled in the art.

Having described the invention, what is claimed is:

1. A catalyst comprising a composite of from about 0.1 to about 50 weight percent of a hydrogenation-dehydrogenation component consisting of a metal or an oxide or sulfide of a metal, or mixtures thereof, selected from the group consisting of nickel, molybdenum, iron, cobalt, rhodium, palladium, tungsten, rhenium and platinum and titanium carbide characterized as a stable phase solid of stoichiometry ranging from about $TiC_{0.52}$ to $TiC_{0.99}$.

2. A catalyst according to claim 1 wherein the titanium carbide is an interstitial solid solution of stoichiometry ranging from about $TiC_{0.70}$ to $TiC_{0.95}$.

3. A catalyst according to claim 1 wherein the weight composition of the titanium carbide ranges from about 99.9 percent to about 50 percent.

4. A catalyst according to claim 1 wherein the catalyst composite contains an acid component, and the sum total of the titanium carbide and acid component ranges from about 99.9 to about 50 percent by weight of the total composite.

5. A composition according to claim 1 wherein the catalyst composite contains an inert component, and the sum total of the titanium carbide and inert component ranges from about 99.9 to about 50 percent by weight of the total composite.

6. A composition according to claim 3 wherein the concentration of the hydrogenation-dehydrogenation component ranges from about 0.1 weight percent to about 20 weight percent and the titanium carbide component from about 80 weight percent to about 99.9 weight percent.

7. A composition according to claim 1 wherein the hydrogenation-dehydrogenation component is comprised of nickel and the weight concentration of nickel, measured as metallic nickel, ranges from about 0.1 to about 50 percent, and the concentration of the titanium carbide from about 99.9 to about 50 percent.

8. A catalyst comprising a composite of from about 0.1 to about 50 weight percent nickel, an oxide or sulfide of nickel, or mixtures thereof, and titanium carbide characterized as a stable phase solid of stoichiometry ranging from about $TiC_{0.70}$ to $TiC_{0.95}$.

9. A catalyst according to claim 8 wherein the weight composition of the titanium carbide ranges from about 99.9 percent to about 50 percent.

10. A catalyst according to claim 8 wherein the catalyst composite contains an acid component, and the sum total of the titanium carbide and acid component ranges from about 99.7 percent to about 85 percent by weight of the total composite.

11. A catalyst according to claim 8 wherein the catalyst composite contains an inert component, and the sum total of the titanium carbide and inert component ranges from about 99.7 percent to about 85 percent by weight of the total composite.

12. A catalyst according to claim 8 wherein the nickel, or an oxide or sulfide of nickel, or mixture thereof, is contained on the composite in concentration ranging from about 0.3 percent to about 15 percent.

13. A catalyst according to claim 12 wherein the weight composition of the titanium carbide ranges from about 99.7 percent to about 85 percent.

* * * * *